(12) United States Patent
Schwetz et al.

(10) Patent No.: US 7,323,018 B2
(45) Date of Patent: Jan. 29, 2008

(54) PROCESS AND DEVICE FOR JACKETING OF BATTERY PLATES

(75) Inventors: Ing. Anton Schwetz, Ebersdorf (AT); Thomas Rotbart, Birkfeld (AT)

(73) Assignee: BM-Battery Machines GmbH, Ebersdorf (AT)

( * ) Notice: Subject to any disclaimer, the term of this patent is extended or adjusted under 35 U.S.C. 154(b) by 618 days.

(21) Appl. No.: 10/841,434

(22) Filed: May 10, 2004

(65) Prior Publication Data

US 2004/0226166 A1 Nov. 18, 2004

(30) Foreign Application Priority Data

May 8, 2003 (AT) ................................ A 702/2003

(51) Int. Cl.
*H01M 10/04* (2006.01)

(52) U.S. Cl. ........................ 29/623.1; 29/730

(58) Field of Classification Search .............. 29/623.1, 29/623.4, 730; 429/144, 145
See application file for complete search history.

(56) References Cited

U.S. PATENT DOCUMENTS

| | | | | |
|---|---|---|---|---|
| 3,216,862 A | * | 11/1965 | Parker et al. ............... | 429/144 |
| 3,333,986 A | * | 8/1967 | Chreitzberg et al. .......... | 429/81 |
| 4,078,124 A | * | 3/1978 | Prentice ...................... | 429/144 |
| 4,663,253 A | * | 5/1987 | Simonton et al. ........... | 429/129 |
| 6,499,208 B2 | | 12/2002 | Schwetz et al. ........... | 29/546.6 |
| 2002/0013999 A1 | * | 2/2002 | Schwetz et al. .............. | 29/730 |
| 2002/0020055 A1 | * | 2/2002 | Schwetz et al. .............. | 29/730 |

FOREIGN PATENT DOCUMENTS

| | | |
|---|---|---|
| AT | 396412 | 9/1992 |
| AT | 409200 | 2/2002 |
| EP | 0506645 | 9/1992 |
| EP | 1164648 | 12/2001 |

* cited by examiner

*Primary Examiner*—Stephen J. Kalafut
(74) *Attorney, Agent, or Firm*—Young & Thompson

(57) ABSTRACT

When lead plates (10) for industrial batteries are jacketed the lead plate (10) is surrounded with a first layer (12) of fiber nonwoven, with a second layer (24) of fiber nonwoven, with a layer (28) of punched or perforated plastic film and with a sleeve (30) of separator material. To simplify the jacketing, the second layer (24) of nonwoven and the layer (28) of plastic film are folded jointly around the lengthwise edges (20, 22) of the lead plate (10) and immediately after the first layer (12) of nonwoven has been folded around the lead plate (10). To do this, the lead plate (10) which has been jacketed in the first layer (12) of nonwoven and the second layer (24) and the layer (28) of plastic film are moved jointly into a folding station (C). In the folding station (C) the layer (28) of plastic film for purposes of securing the two nonwoven layers (12) and (24) which have been placed around the lead plates (10) are closed into a sleeve by joining their lengthwise edges to one another.

21 Claims, 10 Drawing Sheets

PROCESS AND DEVICE FOR JACKETING OF BATTERY PLATES

Figure 1A:
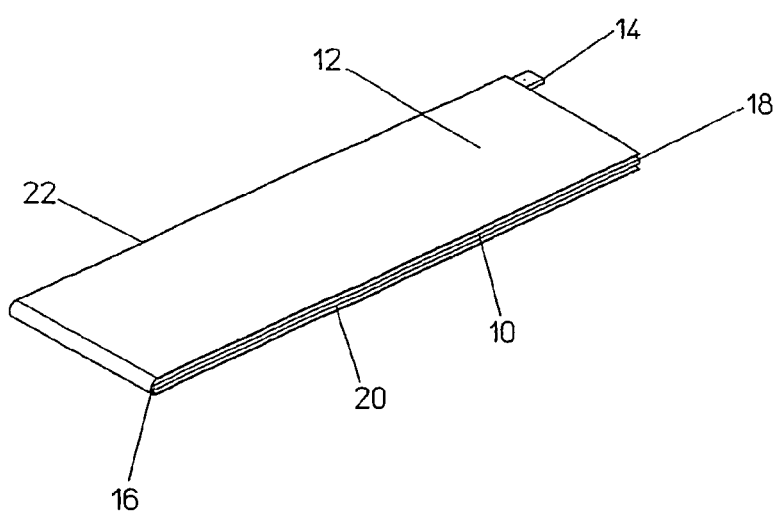

The invention relates to a process for jacketing of battery plates.

In particular positive battery plates of industrial batteries are surrounded before installation in a battery with two layers of (glass fiber) nonwoven, with an outside layer of perforated plastic film and then jacketed with a layer of separator material. Here it is such that the innermost nonwoven layer is folded around the narrow side of the lead plate, especially around the narrow side of the lead plate which is opposite the contact lug, and ends in the area of the contact lug without the two layers of the (glass fiber) nonwoven being joined to one another there. The second layer of (glass fiber) nonwoven is folded over the lengthwise sides of the lead plate, the lengthwise edges of this second layer of (glass fiber) nonwoven overlapping roughly in the area of the lengthwise middle of the lead plate. The layer of perforated plastic film applied over the two glass fiber nonwovens is then used to fix the layers of (glass fiber) nonwoven and is generally folded around the lead plate in the same direction as the second layer of (glass fiber) nonwoven, specifically such that the edges of the perforated plastic film overlap one another essentially in the area of the lengthwise middle of the lead plate, so that they can be joined to one another by welding.

This wrapping of the positive lead plates of industrial batteries in a first layer of nonwoven, in a second layer of nonwoven which is aligned transversely to it, and in the perforated plastic film which has been mounted over it is extremely complex, since the layers of (glass fiber) nonwoven are not fixed before the perforated plastic film is applied.

Ultimately a sleeve of separator material (plastic which is permeable to electrolyte) is slipped over the battery plate which has been wrapped in this way; the sleeve is open on the two narrow sides of the plate, therefore on the narrow side on which the contact lug projects, and the opposing narrow side of the lead plate. Generally a previously formed sleeve is pushed over the lead plate which has been wrapped as described with two layers of nonwoven and a layer of perforated plastic film, as is shown and described for example in AT 409 200 B. Here the lengthwise seam of the sleeve of separator material is preferably located in the area of the lengthwise edge of the lead plate.

For wrapping the first layer of nonwoven around the narrow side of the battery plate opposite the contact lug, known and proven devices can be advantageously used, for example the devices known from U.S. Pat. No. 5,803,935 A, AT 396 412 B (=EP 0 506 645 A) or from EP 1 164 648 A.

To date there have only been devices of very complex structure for mounting the second layer of nonwoven and the perforated plastic film, The object of the invention is to devise a process and a device with which the jacketing of battery plates, especially the positive battery plates of industrial batteries, with a second layer of nonwoven and with perforated plastic film is possible quickly and without manual effort.

The process as claimed in the invention and the device as claimed in the invention yield the following advantages:

One advantage of the invention is that the second layer of (glass fiber) nonwoven need not be held until the perforated plastic film has been wrapped around and has been closed into a sleeve by connecting its overlapping lengthwise edges. Furthermore the time and equipment cost in the invention is low since the second layer and the perforated plastic film are wrapped around the battery plate at the same time into one device.

Other details, features and advantages of the invention arise from the following description of one sample device (unit) for jacketing the positive lead plates of industrial batteries.

Figure 1B:
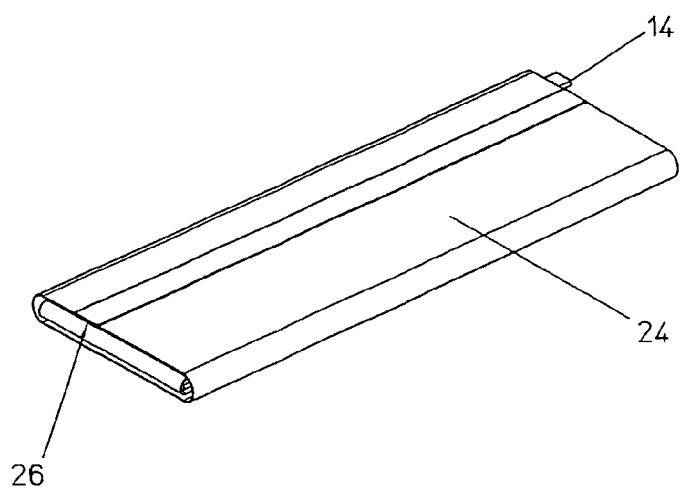
Figure 1C:
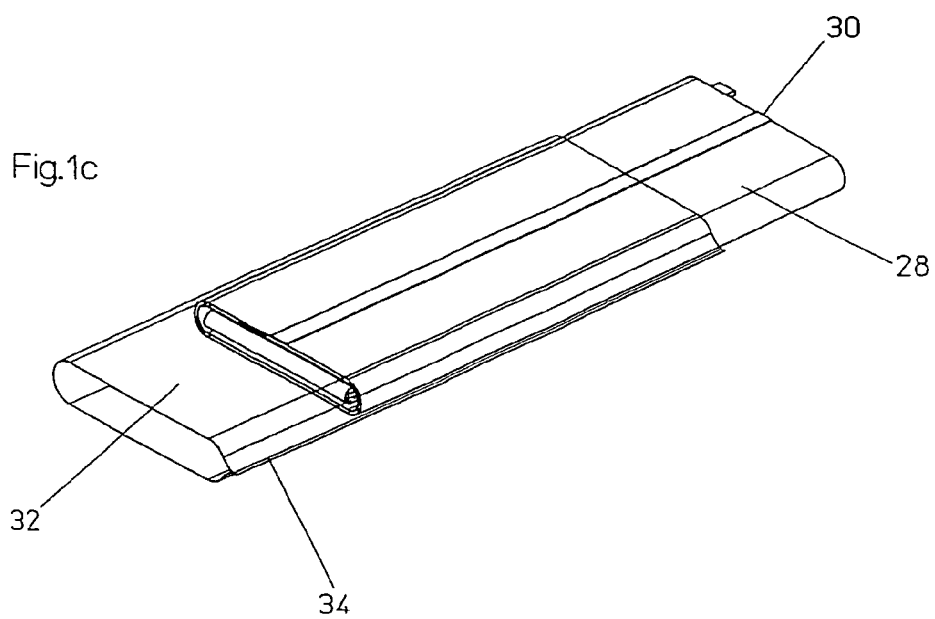
Figure 2:
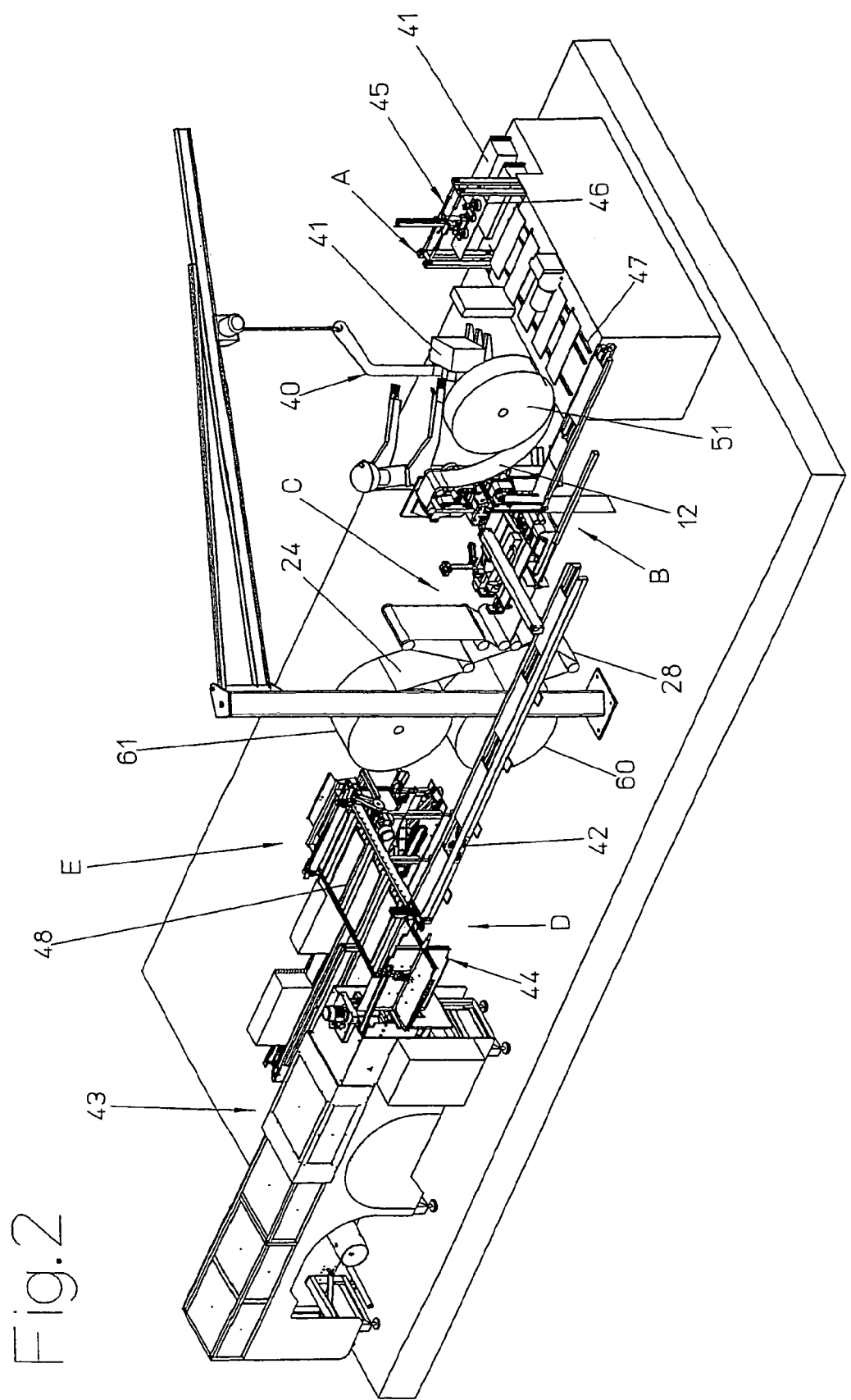
Figure 3:
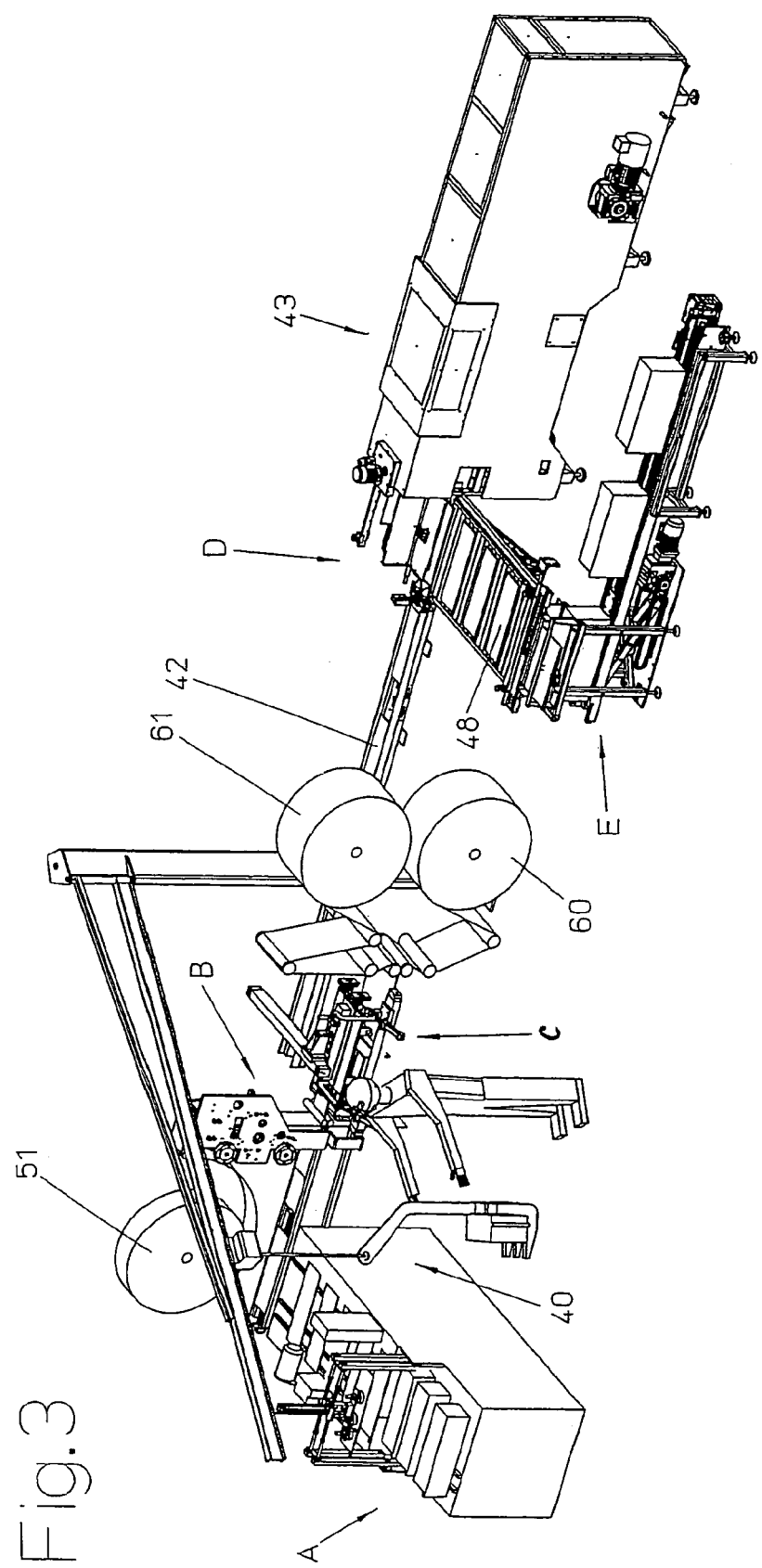
Figure 4:
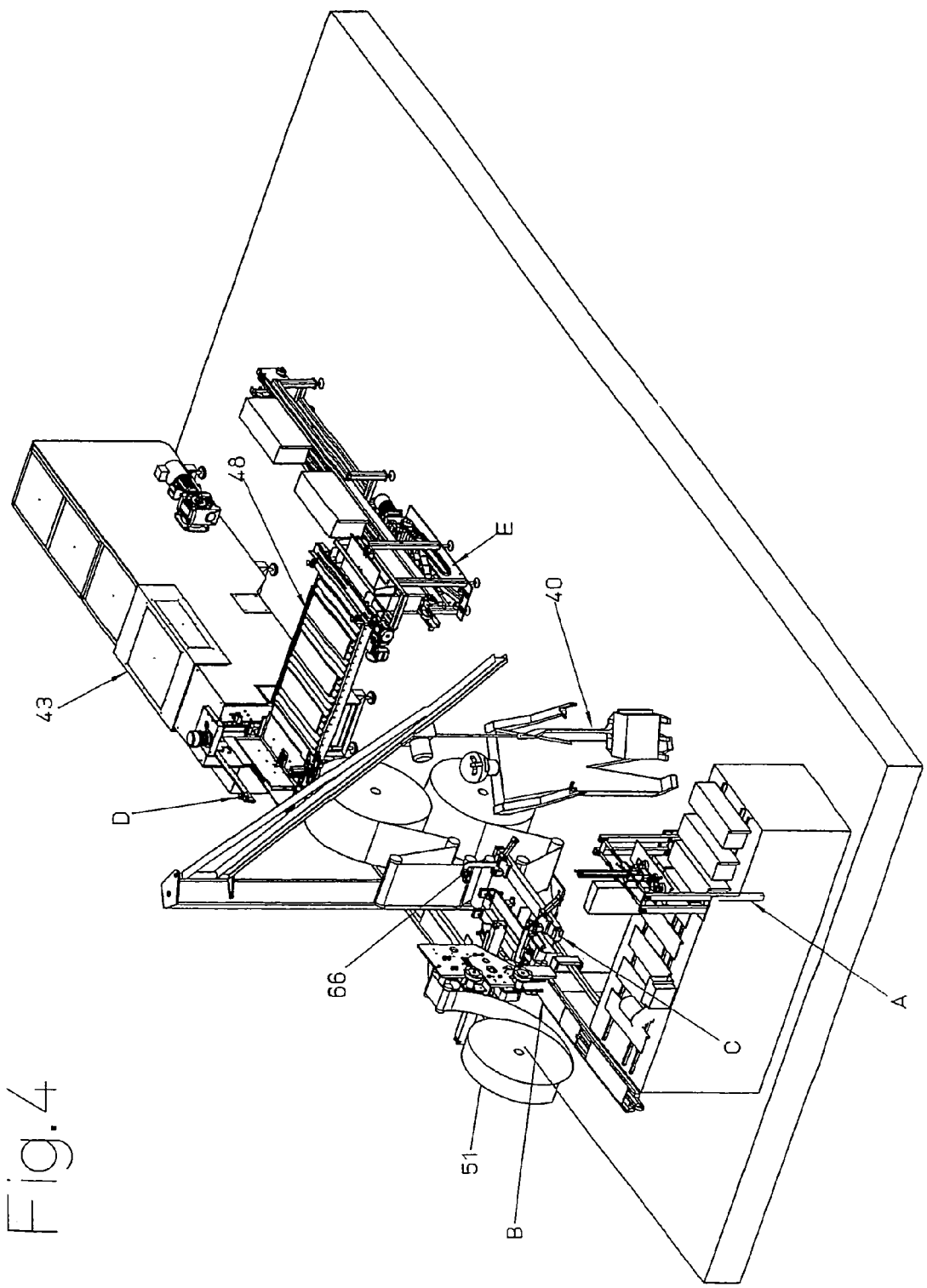
Figure 5:
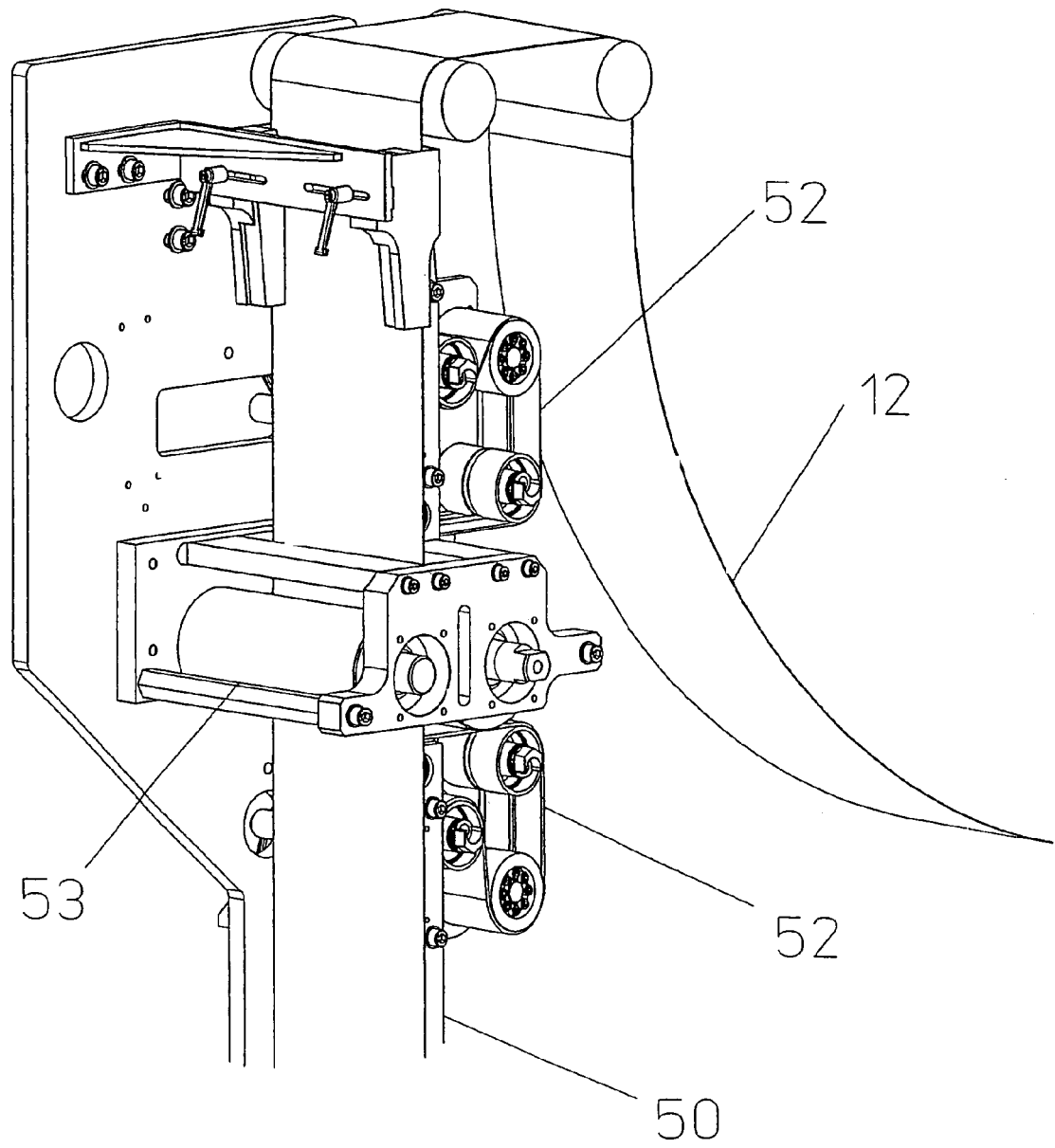
Figure 6:
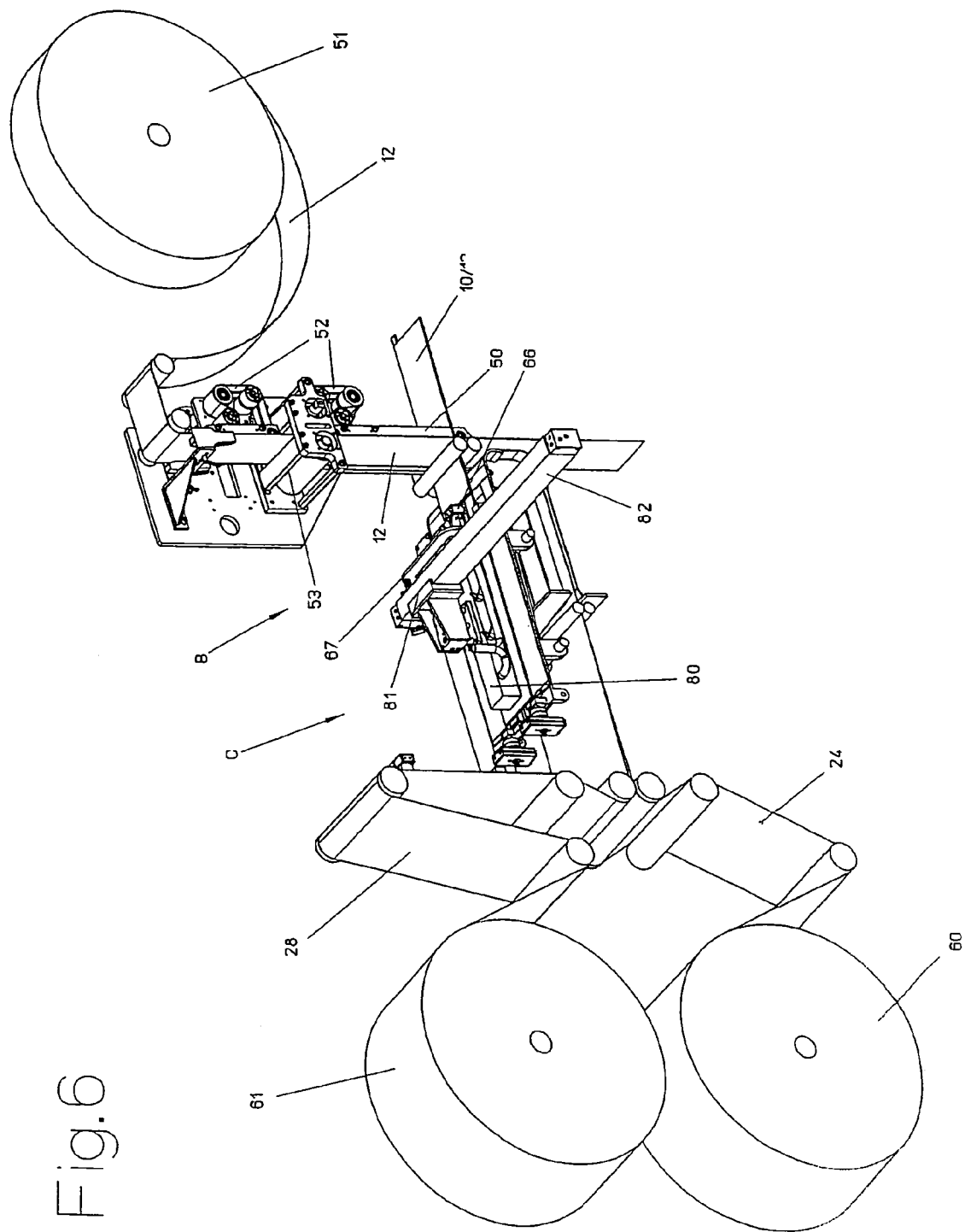
Figure 7:
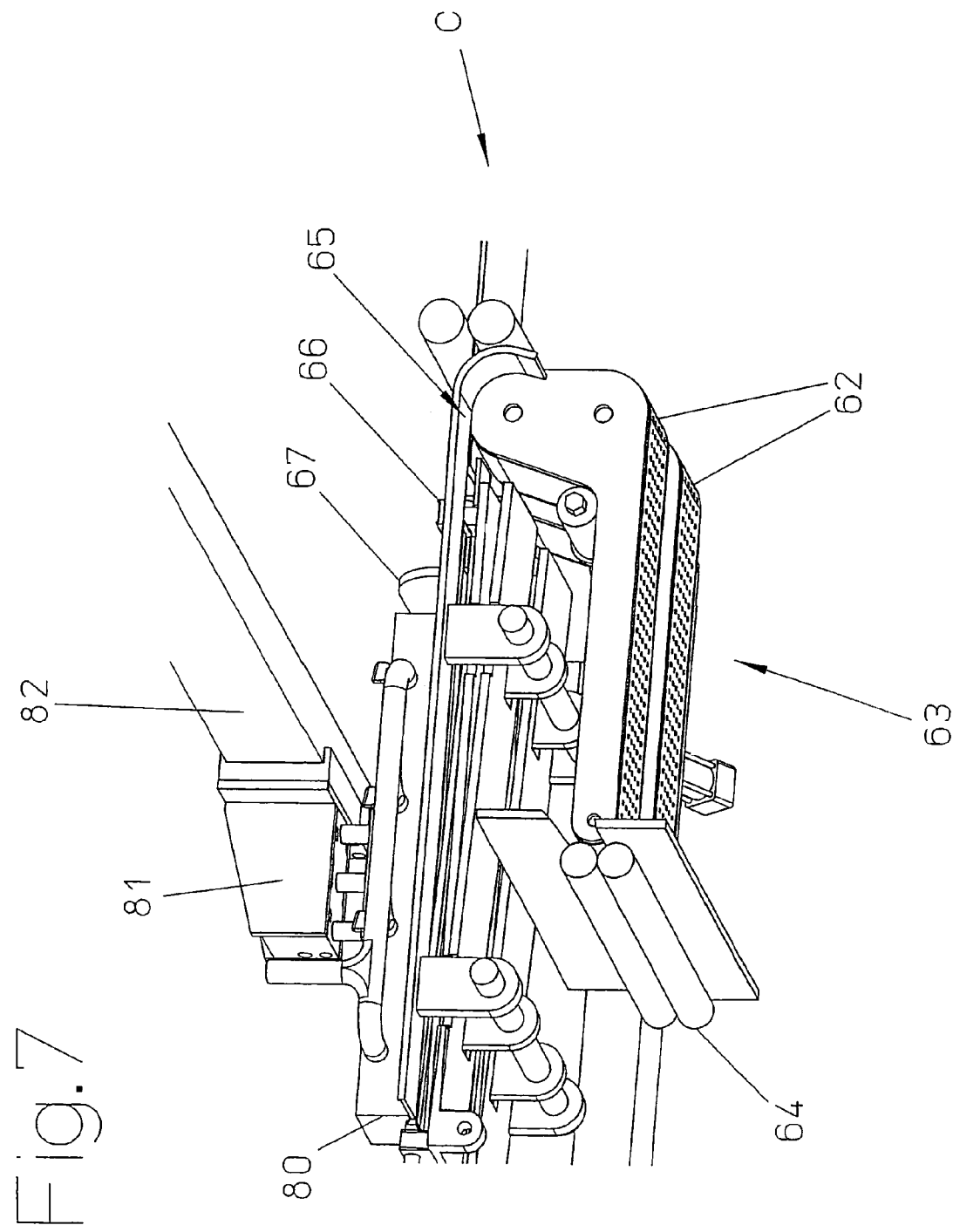
Figure 8:
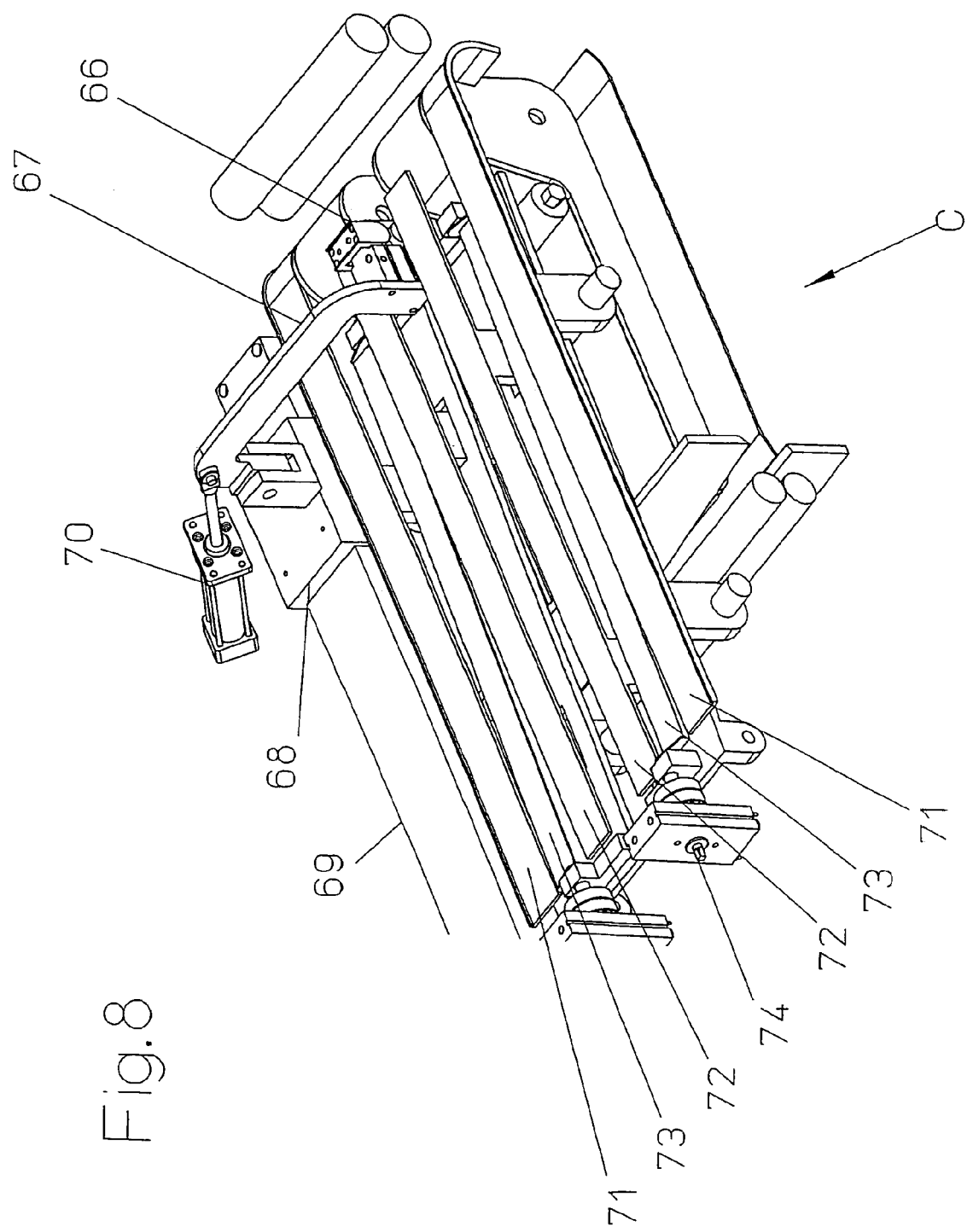
Figure 9:
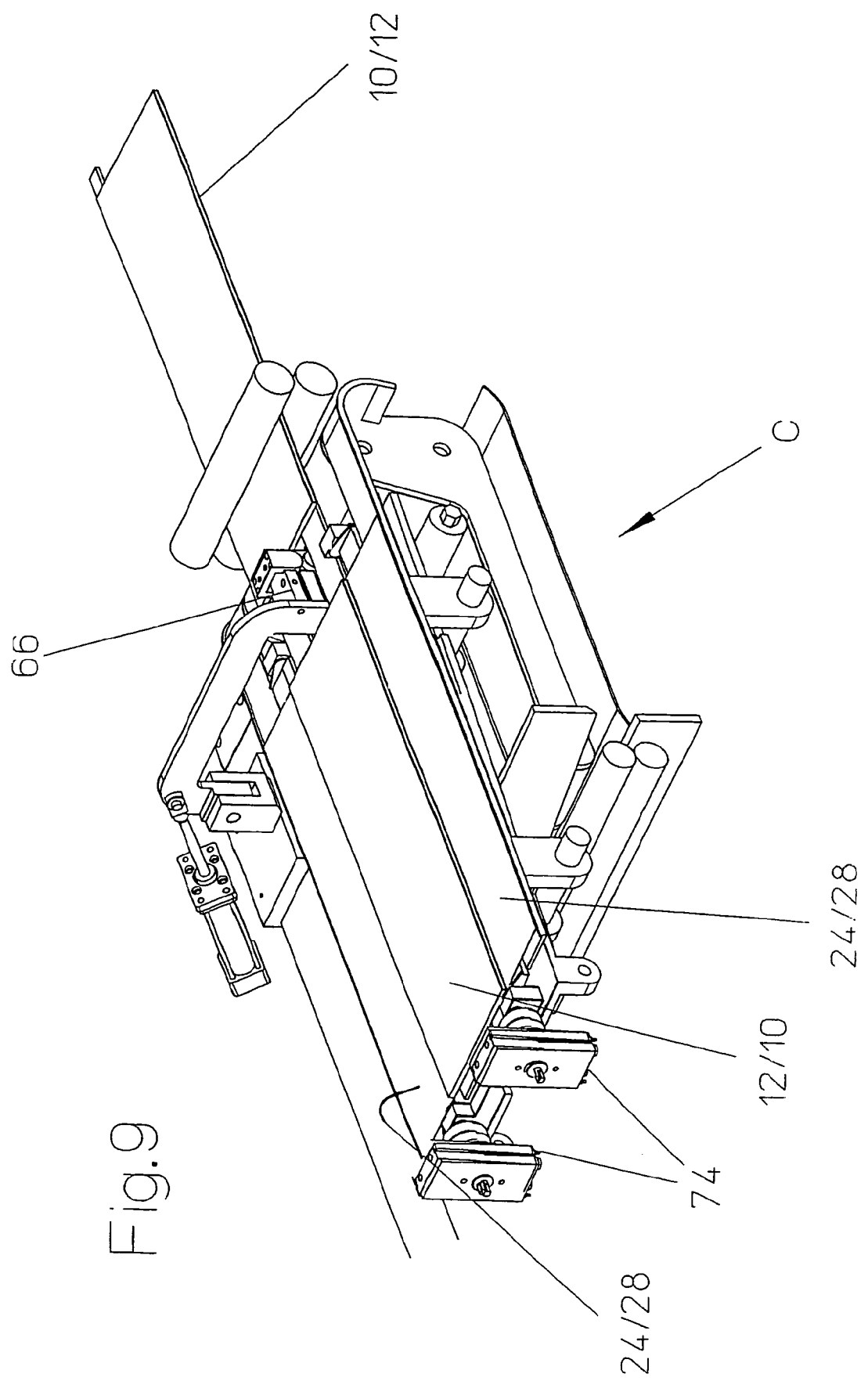
Figure 10:
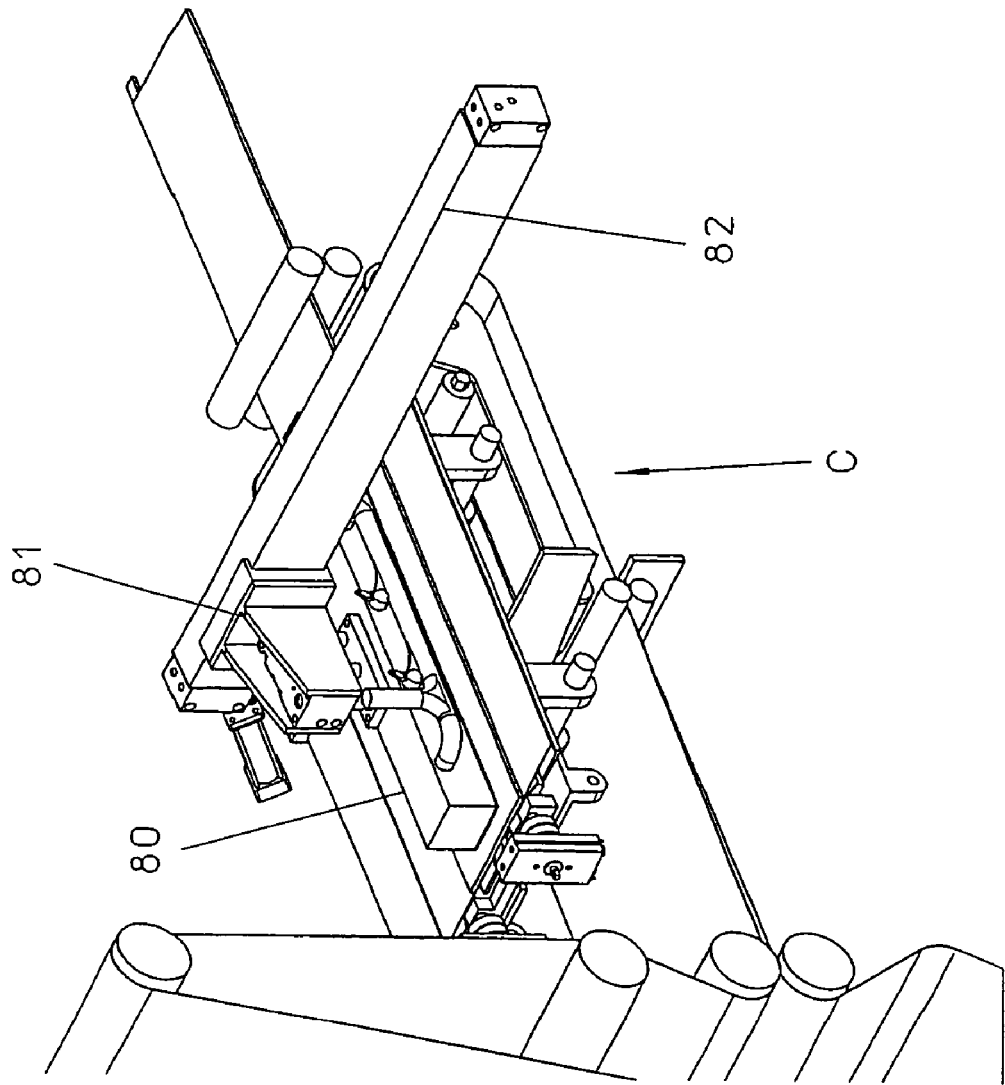

FIGS. 1a to 1c show the steps in jacketing of a lead plate for an industrial battery, FIG. 2 shows a unit for jacketing a lead plate for an industrial battery, FIG. 3 shows the unit from FIG. 2 viewed from another direction, FIG. 4 shows the unit from FIGS. 2 and 3 viewed from still another direction, FIG. 5 shows the station of the unit for cutting to length the first layer of glass fiber nonwoven, FIG. 6 shows the station of the unit for folding the first layer of nonwoven around the lead plate and the station for wrapping the second layer of nonwoven and the layer of perforated plastic film, FIG. 7 shows a detail of the station for wrapping the second layer of nonwoven and the layer of perforated plastic film viewed obliquely from underneath, FIG. 8 shows the detail from FIG. 7 viewed obliquely from overhead, FIG. 9 shows the detail from FIG. 8 with a battery plate jacketed once with nonwoven and FIG. 10 shows the detail from FIGS. 8 and 9 in another working position.

Positive lead plates of industrial batteries which can be jacketed in the device described below (unit of the invention) using the process as claimed in the invention have a width of for example 144 mm and, depending on the size of the industrial battery and its desired capacitance, a length between 180 and 620 mm.

As is shown in FIGS. 1a to 1c, first of all (FIG. 1a) a layer 12 of nonwoven of glass fibers or the like (or similar liquid-permeable material) is folded around the narrow side 16 which is opposite the contact lug 14 of the lead plate 10 such that the free ends of the layer 12 come to rest on the narrow side 18 of the lead plate 10 on which the contact lug 14 is provided. This can be done for example with a device as claimed in U.S. Pat. No. 5,803,935 A, EP 0 506 645 A or EP 1 164 648 A.

The resulting arrangement of the lead plate 10 and layer 12 of nonwoven is surrounded by another (glass fiber) nonwoven layer 24 which is folded around the lengthwise edges 20, 22 of the plate 10 such that they overlap in the area 26 roughly in the lengthwise middle of the lead plate 10 (FIG. 1b).

A perforated plastic film 28 is wrapped around the resulting arrangement of the lead plate 10 and the two nonwoven layers 12 and 24 in the manner of the second nonwoven layer 24 and in the overlapping area is closed into a sleeve with a seal seam 30 (weld).

The resulting arrangement of the lead plate 10, the two (glass fiber) nonwoven layers 12 and 24 and the plastic film 28 is pushed into a sleeve of separator material as shown in FIG. 1c, which consists of a flat material 32 and is fixed with a lengthwise seam 34 to form the sleeve.

The unit (device) for jacketing of battery plates shown in FIGS. 2, 3 and 4 viewed from different directions consists of the following basic stations as shown in FIGS. 1a to 1c:

A station A for separating the lead plates 10 for industrial batteries which have been delivered in packages 41 using a hoisting device 40.

A station B for wrapping strips (layers 12) of (glass fiber) nonwoven around the plates 10, and this device can be built for example in the manner as the devices described in U.S. Pat. No. 5,803,935 A, in EP 0 506 645 A and in EP 1 164 648 A.

A station C which is connected downstream of the aforementioned station B for wrapping the lead plates 10 covered with a layer 12 of (glass fiber) nonwoven in another layer 24 of (glass fiber) nonwoven and a layer 28 of perforated plastic film.

A station D in which the lead plate 10 originating from the station C is surrounded by a sleeve of separator material. This station D comprises a conveyor device 42 for feeding the jacketed lead plates 10, a device 43 for producing the tube-shaped sections (sleeves) of separator material and a means 44 for slipping the wrapped lead plates into the sleeves of separator materials. The device for producing the sleeves of separator material can be aligned similarly to the manner as is described in IT 01280641 A. The device for inserting the jacketed lead plate 10 can be made similarly to the device described in AT 409 200 B.

A station E for stacking the jacketed lead plates 10 which have been obtained in this way for industrial batteries.

Even if here the procedure (process) and the device as claimed in the invention are described using the jacketing of lead plates for industrial batteries, this manner of operation can be used essentially for all battery plates.

The individual stations are described individually below.

In station A, to prepare the lead plates 10, the lead plates for industrial batteries which are supplied as stacks 41 (packets) using the hoisting device 40 are placed on a feed device and gradually supplied by it to a separating device 45. In the separating device 45 the lead plate 10 which is uppermost at the time is raised using a vacuum gripper 46 and deposited on a transverse conveyor 47 with which it is supplied to the downstream station B for wrapping a strip 12 of (glass fiber) nonwoven around lead plates 48, as shown in FIG. 1a.

This station B has an area 50 (shaft or channel, FIG. 5, 6) in which strips 12 of glass fiber nonwoven which have been cut to the length required at the time by rotary shears 53 and which are supplied from a storage roller 51 using vacuum-pressurized conveyor belts 52 are prepared for wrapping. The strips 12 of (glass fiber) nonwoven are wrapped by the lead plate 10 being advanced transversely to the strips 12 of (glass fiber) nonwoven which are kept ready for example in a shaft or channel 50, so that the strip 12 is pulled out of the channel 50 as it is folded around the lead plate 10 as shown in FIG. 1a.

Following this station B, there is station C for wrapping another strip 24 of (glass fiber) nonwoven and the layer 28 of perforated plastic film as shown in FIG. 1a and FIG. 1c. The particular aspect consists in that the strip 24 of glass fiber nonwoven on the one hand and the perforated plastic film 28 on the other in a single joint step are wrapped and folded around the lead plate 10 which has been wrapped in the first strip 12 of glass fiber nonwoven.

To do this, for this station there are feed rolls 60, 61 for (glass fiber) nonwoven 24 on the one hand (bottom roll 60) and perforated plastic film 28 (top roll 61) on the other. The strip of glass fiber nonwoven 24 and the plastic film 28 are supplied jointly to a transport device 63 which is equipped with continuous vacuum belts 62. On the entry side of the vacuum belts 62 there are rotary shears 64 which cut off the corresponding (required at the time) pieces on the one hand from the supplied strips of glass fiber nonwoven 24 and from the perforated plastic film 28 on the other. These pieces of glass fiber nonwoven 24 and perforated plastic film 28 obtained in this way are moved by the vacuum belts 62 into the area 65 of the vacuum belts 62 which has been deflected upward. They are then aligned such that their forward edges are essentially flush with the forward edge of a lead plate 10 which has been wrapped in the first layer 12 of (glass fiber) nonwoven and which is "waiting" on the conveyor device in front of the folding station C (compare FIG. 6). The lead plate 10 which has been wrapped in the layer 12, the second (glass fiber) nonwoven 24 and the perforated plastic film 28 are grasped by a gripper 66 and pulled into the position shown in FIG. 9 on the folding station C. The gripper 66 is attached as shown in FIG. 8 to a hoop 67 which is supported to be able to swivel on a carriage 68, and the carriage 68 can be moved on a guide 69.

The hoop 67 can be swivelled up using a hydraulic motor 70 out of the position (acting position) shown in FIGS. 8 and 9 for the return stroke into the readiness position which is shown in FIG. 4.

The folding station C has folding strips 73 which are located between the support strips 71, 72 and which can be swivelled using the rotary drives 74 in order to wrap, as shown in FIG. 9, the areas of the second layer 24 of glass fiber nonwoven which laterally project over the lengthwise edges 20 and 22 of the lead plate 10 on the one hand and the layer 28 of perforated plastic film on the other at the same time over the lateral lengthwise edges of the lead plate 10. Here the second layer 24 of glass fiber nonwoven is laterally offset to the layer 28 of perforated plastic so that when the plastic layer 28 is welded using a welding device 80 which works from overhead (see FIGS. 6 and 7) the lengthwise edges of the layer 28 of perforated plastic film come to rest directly on one another and the welding process is not hindered by the layer 24 of nonwoven.

The resulting lead plate 10 which has been wrapped in a first layer 12 of glass fiber nonwoven, in a second layer 24 of glass fiber nonwoven and finally in a layer 28 of perforated plastic film welded into a sleeve is delivered using a vacuum gripper 80 (it is combined in the embodiment shown with the welding means into a combined unit so that it produces the weld 34 in the perforated plastic film 28) by moving the vacuum gripper 80 via a carriage 81 along a guide 82 to the lengthwise conveyor which moves the wrapped lead plates 10 to the station D in which the lead plates 10 are pushed into sleeves 32 of separator material (for example, a plastic which is permeable to electrolytes).

The station D for producing the sleeves of separator material and for inserting the lead plates 10 which as shown in FIG. 1c are wrapped in two layers of glass fiber nonwoven 12, 24 and one layer 28 of perforated plastic film, can in principle have a similar structure to the units known from IT 01 280 641 A and AT 409 200 B. The lead plates 10 which have been inserted into the sleeves 32 of separator material are then moved on a transverse conveyor 48 to a stacking station E, stacked on top of one another in the stack with the number of jacketed battery plates 10 desired at the time, and are removed.

In summary one embodiment of the invention can be described as follows:

When lead plates 10 for industrial batteries are jacketed the lead plate 10 is surrounded with a first layer 12 of fiber nonwoven, with a second layer 24 of fiber nonwoven, with a layer 28 of punched or perforated plastic film and with a sleeve 30 of separator material. To simplify the jacketing, the second layer 24 of nonwoven and the layer 28 of plastic film are folded jointly around the lengthwise edges 20, 22 of the lead plate 10 and immediately after the first layer 12 of nonwoven has been folded around the lead plate 10. To do this, the lead plate 10 which has been jacketed in the first layer 12 of nonwoven and the second layer 24 and the layer 28 of plastic film are moved jointly into a folding station C. In the folding station C the layer 28 of plastic film for purposes of securing the two nonwoven layers 12 and 24 which have been placed around the lead plates 10 are closed into a sleeve by joining their lengthwise edges to one another.

The invention claimed is:

1. Process for jacketing of battery plates, the plate being surrounded with a first layer of nonwoven fiber, with a second layer of nonwoven fiber, with a plastic film which has openings, and finally with a separator material, characterized in that after wrapping the first layer of nonwoven fiber around the battery plate the second layer of nonwoven fiber and the plastic film are wrapped jointly around the battery plate which has been wrapped in the first layer of nonwoven fiber.

2. Process as claimed in claim 1, wherein the first layer of nonwoven fiber is folded around the narrow edge of the plate, and wherein the second layer of nonwoven fiber as well as the plastic film are folded jointly and at the same time around the lengthwise edges of the battery plate.

3. Process as claimed in claim 1, wherein the second layer of nonwoven fiber and the plastic film are moved jointly into the position which is aligned for their wrapping around the battery plate.

4. Process as claimed in claim 1, wherein the second layer of nonwoven fiber and the plastic film are moved jointly with the battery plates which has been wrapped in the first layer of nonwoven fiber into the area in which the second layer and the plastic film are wrapped around the battery plate.

5. Process as claimed in claim 1, wherein the first layer of nonwoven fiber and the second layer of nonwoven fiber on the battery plate are fixed by joining the adjacent edges of the plastic film to one another into a sleeve.

6. Process as claimed in claim 5, wherein the overlapping edges of the plastic film are joined to one another by bonding.

7. Process as claimed in claim 1, wherein the second layer of nonwoven fiber and the plastic film offset from one another transversely to the direction in which they are wrapped around the battery plate are moved into the position which is aligned for folding around the battery plate.

8. Process as claimed in claim 1, wherein the second layer of nonwoven fiber and the plastic film are moved from the bottom to the battery plate which has been wrapped in the first layer of nonwoven fiber.

9. Process as claimed in claim 1, wherein the edges of the second layer of nonwoven fiber and the plastic film which are forward relative to the direction of motion are aligned to the edge of the battery plate which is forward relative to the direction of motion, before the battery plate, the second layer of nonwoven fiber and the plastic film are moved into the position in which the second layer and the plastic layer are wrapped around the battery plate.

10. Device for jacketing of battery plates, with stations for wrapping a first layer of nonwoven fiber (B, 12), a second layer of nonwoven fiber (C, 24) and a layer of perforated plastic film (28) around a battery plate (10) and for inserting the battery plate (10) into a jacket (30) of separator material, wherein after station (B) for wrapping the first layer of nonwoven fiber (24) around the battery plate there is a station (C) which is equipped with folding means (73) in order to wrap the second layer (24) of nonwoven fiber jointly with the plastic film (28) around the battery plate (10).

11. Device as claimed in claim 10, wherein the station (C) has two folding strips (73) which can be swivelled around the axes which lie in the area of the lengthwise edges (20, 22) of the battery plate (10).

12. Device as claimed in claim 11, wherein there are rotary drives (74) for swivelling the folding strips (73).

13. Device as claimed in claim 10, wherein the station (C) has a means (62) for joint feed of the second layer of nonwoven fiber (24) and the perforated plastic film (28).

14. Device as claimed in claim 13, wherein the means (62) for supplying the second layer (24) of nonwoven fiber and the plastic film (28) has negatively pressurized conveyor belts (62).

15. Device as claimed in claim 14, wherein on the input side of the negatively pressurized conveyor belts there is a device (64) for cutting to length the layer (24) of nonwoven fiber from a length of nonwoven fiber and the plastic film (28) from a strip of plastic film.

16. Device as claimed in claim 15, wherein the device for cutting to length is rotary shears (64).

17. Device as claimed in claim 10, wherein between the folding means (73) in the folding station (C) there is a feed means, wherein the feed means is equipped with a gripper (66) for grasping the battery plate (10) which has been wrapped in a first layer (12) of nonwoven fiber, the plastic film (28) and the second layer (24) of nonwoven fiber.

18. Device as claimed in claim 17, wherein negatively pressurized conveyor belts (62) on the delivery side are deflected (65) up and wherein one end position of the gripper (66) lies in the area (65) of the conveyor belts (62) which has been deflected up.

19. Device as claimed in claim 10, wherein there is a removal gripper (80) to lift battery plates (10) which have been wrapped in the first layer (12) of nonwoven fiber, the second layer (24) of nonwoven fiber and the plastic film (28), out of the folding station (C).

20. Device as claimed in claim 19, wherein the removal gripper (80) has a device for joining overlapping edges of the plastic film (28).

21. Device as claimed in claim 17, wherein the gripper (66) of the feed direction for moving the battery plate (10), the second layer (24) of nonwoven fiber and the plastic film (28) to the folding device (73) is mounted on a hoop (67), and wherein the hoop (67) is pivotally supported on a carriage (68) which can be moved laterally next to the folding device (73) on a guide rail (69).

* * * * *